United States Patent [19]

Sugimori et al.

[11] Patent Number: 4,673,529
[45] Date of Patent: Jun. 16, 1987

[54] PHENOXYPROPANOL ESTER DERIVATIVE

[75] Inventors: Shigeru Sugimori, Fujisawashi; Tetsuya Ogawa, Yokohamashi; Yasuyuki Goto, Yokohamashi; Toyoshiro Isoyama, Yokohamashi; Kazunori Nigorikawa, Yokohamashi; Kisei Kitano, Yokohamashi; Naoyuki Yoshida, Kamakurashi; Yoshito Furukawa, Yokohamashi, all of Japan

[73] Assignee: Chisso Corporation, Tokyo, Japan

[21] Appl. No.: 803,215

[22] Filed: Nov. 27, 1985

[30] Foreign Application Priority Data

Nov. 28, 1984 [JP] Japan .................... 59-251328
Dec. 24, 1984 [JP] Japan .................... 59-272197

[51] Int. Cl.$^4$ .............. C09K 19/30; C09K 19/12; C07C 69/76; C07C 69/74; C07C 79/44; C07C 101/02; C07C 121/60
[52] U.S. Cl. .................. 252/299.63; 252/299.5; 252/299.6; 252/299.65; 252/299.66; 350/350 R; 558/414; 558/415; 558/416; 558/426; 558/430; 558/431; 560/59; 560/61; 560/62; 560/102; 560/106; 560/107; 560/118; 560/125; 560/126; 560/1
[58] Field of Search ........... 252/299.5, 299.63, 299.65, 252/299.66, 299.6; 350/350 R, 350 S; 558/414, 415, 416, 426, 430, 431; 560/59, 61, 62, 102, 106, 107, 118, 125, 126, 1

[56] References Cited

U.S. PATENT DOCUMENTS 4,035,056  7/1977  Coates et al. ............... 252/299.66

FOREIGN PATENT DOCUMENTS 168043   1/1986  European Pat. Off. ....... 252/299.63
3225290  1/1984  Fed. Rep. of Germany ............ 252/299.63
60-215652 10/1985 Japan ................ 252/299.63
60-246347 12/1985 Japan ................ 252/299.63
60-255779 12/1985 Japan ................ 252/299.63
61-5052   1/1986  Japan ................ 252/299.63
61-5054   1/1986  Japan ................ 252/299.63
61-40271  2/1986  Japan ................ 252/299.61
61-68447  4/1986  Japan ................ 252/299.63

OTHER PUBLICATIONS

Shriohar, D. R., et al., J. Pharm. Sci., vol. 65(7), pp. 1074–1078 (1976).

C.A., vol. 89, 42703z (1978).
C.A., vol. 89, 108542e (1978).

Primary Examiner—Teddy S. Gron
Attorney, Agent, or Firm—Wenderoth, Lind & Ponack

[57] ABSTRACT

A novel liquid crystal compound useful as a component of liquid crystal compositions and a liquid crystal composition containing the same are provided, which compound is a phenoxypropanol ester derivative expressed by the formula

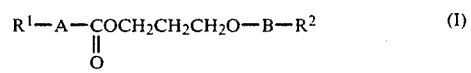

wherein $R^1$ and $R^2$ each represent an alkyl group or an alkoxy group each of 1 to 15 carbon atoms, F atom, Cl atom or CN group, but either one of $R^1$ and $R^2$ is necessarily said alkyl group or alkoxy group: A represents

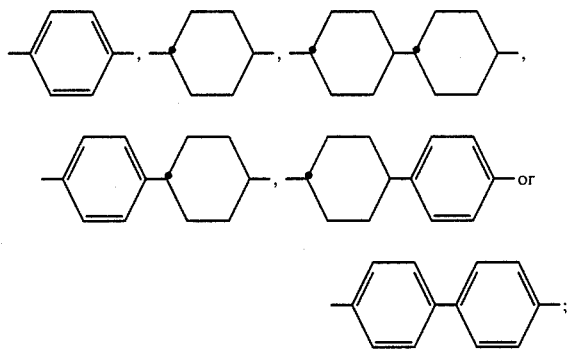

and B represents

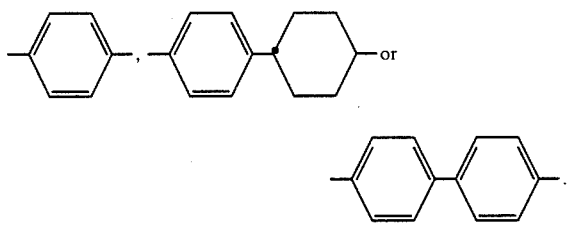

6 Claims, No Drawings

PHENOXYPROPANOL ESTER DERIVATIVE

BACKGROUND OF THE INVENTION

This invention relates to a phenoxypropanol derivative as a novel liquid crystal compound and a liquid crystal composition containing the same.

Display elements utilizing liquid crystals have been broadly used for watches, electric calculators, etc. These liquid crystal display elements utilize the optical anisotropy and dielectric anisotropy of liquid crystal substances, and the liquid crystal phases include nematic liquid crystal phase, smectic liquid crystal phase and cholesteric liquid crystal phase. However, among these, display elements utilizing nematic liquid crystals have been most broadly practically used. These display elements are classified into TN (twisted nematic) type, DS (dynamic scattering) type, guest-host type, DAP type, etc., and there vary properties required for liquid crystal substances used for these respective display elements. As for such liquid crystal substances, those which exhibit liquid crystal phases within a temperature range as broad as possible are preferable, and also those which are stable to moisture, light, heat, air, etc. have been required. However, it is the present status that there is no single substance which satisfies the above conditions, but several kinds of liquid crystal substances are mixed with one another or with substances similar to liquid crystals, for practical use.

European patent application No. 104327 laid-open on Apr. 4, 1984 discloses a cyclic compound expressed by the formula

wherein $R^1$ and $R^2$ each represent an alkyl or an alkoxy each of 1~12 carbon atoms, or F, Cl, Br, CN or —Q$^3$—R$^3$, or one of $R^1$ and $R^2$ is H; $Q^1$, $Q^2$ and $Q^3$ each represent 1,4-phenylene, 1,4-cyclohexylene, 1,4-bicyclo(2.2.2)-octylene or 1,3-dioxan-2,5-diyl group which is unsubstituted or substituted by 1~4 atoms of F, Cl and/or Br; $R^3$ represents an alkyl or an alkoxy each of 1~8 carbon atoms in each case, or H, F, Cl, Br or CN; m is 1, 2, 3, 4, 5 or 6; n is 0 or 1; and p is 1, 2, 3, 4 or 5; the total of (m+p) is 2, 4 or 6; and the total of (m+n+p) is at least 3; but in the case where n=1 and/or (m+p)=6 and/or at least one of groups $R^1$~$R^3$ is F, Cl or Br, and/or neither of groups $R^1$~$R^3$ is not CN and/or two of $R^1$~$R^3$ are CN, then $Q^3$ represents only 1,4-phenylene group which is unsubstituted or substituted by F, Cl or Br atom. However, the compound of the present invention is not included in the disclosed compound.

SUMMARY OF THE INVENTION

The object of the present invention is to provide a novel liquid crystal compound useful as a component of liquid crystal compositions usable for the abovementioned purposes.

The present invention resides in
a phenoxypropanol ester derivative expressed by the formula

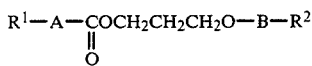

wherein $R^1$ and $R^2$ each represent an alkyl group or an alkoxy group each of 1 to 15 carbon atoms, F atom, Cl atom or CN group, but either one of $R^1$ and $R^2$ is necessarily said alkyl group or alkoxy group; A represents

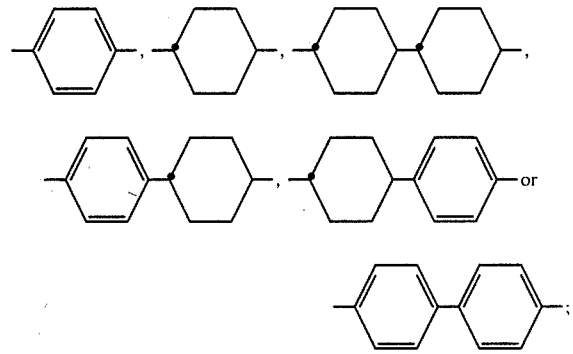

and B represents

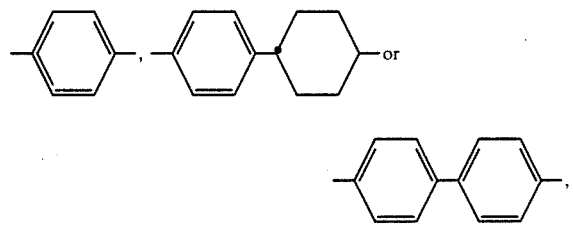

and
a liquid crystal composition containing the same.

DETAILED DESCRIPTION OF THE INVENTION

Any of the compounds of the present invention are superior in the stability to moisture, heat, light, etc. and also compatible with other liquid crystal compounds such as those of esters, Schiff's compounds, azoxy compounds, biphenyls, cyclohexanes, etc; hence by mixing these compounds or mixtures thereof with those of the present invention, it is possible to constitute a liquid crystal composition suitable for various liquid crystal display elements. As to the compounds of the present invention, most of them, as shown in Table 1, are nematic, liquid crystalline, but some are monotropic, nematic liquid crystals, some exhibit smectic liquid crystalline phase and some exhibit no definite liquid crystalline phase (such compounds exhibiting no definite liquid crystalline phase are mixed with other liquid crystals, the values of their N-I points are determined by extrapolation method and a symbol * is attached to the values in the table). Anyhow, however, when the compounds of the present invention are used, it is possible to enlarge the freeness of choice of components at the time of constituting a liquid crystal composition, and also the compounds are useful for broadening the mesomorphic range.

Next, preparation of the compound of the present invention will be illustrated.

3-Bromo-1-propanol was reacted with a 4-substituted phenol (II) in ethanol in the presence of potassium hydroxide to prepare a 3-(4-substituted phenyloxy)-1-propanol (III), which was then reacted with a carboxylic acid chloride corresponding to the objective compound in the presence of pyridine to prepare a phenoxypropanol ester derivative (I) as the objective compound. This process is shown by the following equations:

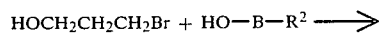

(II)

(III)

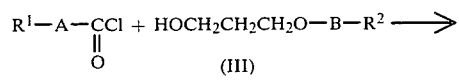

(III)

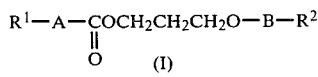

(I)

wherein $R^1$, $R^2$, A and B are as defined above.

The present invention will be described in more detail by the following Examples, but it should not be construed to be limited thereto.

EXAMPLE 1

Preparation of trans-4-propylcyclohexanecarboxylic acid 3-(4'-cyano-4-biphenylyl)-1-propyl ester (a compound of formula (I) wherein $R^1=C_3H_7$,

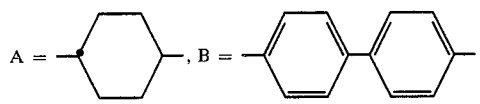

and $R^2=CN$)

(i) Preparation of 3-(4'-cyano-4-biphenylyl)-1-propanol

4'-Cyano-4-hydroxybiphenyl (6 g, 0.02 mol) and 3-bromo-1-propanol (5.6 g, 0.04 mol) were dissolved in ethanol (300 ml), followed by gradually dropwise adding an aqueous solution of sodium hydroxide (10 g) in water (20 ml) over 30 minutes, continuing, as it was, stirring for 40 hours, thereafter distilling off ethanol (about 200 ml) under reduced pressure, then adding water (500 ml), extracting the resulting deposited crystals three times with toluene (100 ml), removing insoluble matter by filtration, washing the toluene layer twice with a 2N aqueous solution of NaOH, further 3 times with water, drying over anhydrous sodium sulfate, completely distilling off toluene and recrystallizing the residual crystals from methanol to prepare 3-(4'-cyano-4-biphenylyl)-1-propanol. Yield: 2 g (28%). This product exhibited liquid crystal phases and its C-N point was 109.0°~110.7° C. and its N-I point was 113.6° C.

Esterification 3-(4'-Cyano-4-biphenylyl)-1-propanol (1.8 g, 0.005 mol) obtained in the above (i) was dissolved in pyridine (20 ml), and to the solution was added trans-4-propylcyclohexanecarboxylic acid chloride (1.0 g, 0.005 mol) with sufficient shaking, followed by allowing the reaction fluid to stand overnight, thereafter pouring it in water (100 ml), extracting the resulting oily substance with toluene (100 ml), washing the toluene layer with 6N-HCl and then with 2N-NaOH aqueous solution, washing with water till the washing water became neutral, then filtering, distilling off toluene under reduced pressure and recrystallizing the residual crystals from ethanol to obtain the objective trans-4-propylcyclohexanecarboxylic acid 3-(4'-cyano-4-biphenylyl)-1-propyl ester (0.9 g, yield 44%). This product is a nematic liquid crystal having a C-N point (crystalline-nematic point) of 84.8°~85.2° C. and a N-I point (nematic-clearing point) of 85.9° C.

EXAMPLES 2~23

Other compounds of the formula (I) were prepared in same manner as in Example 1. The phase transition points of these compounds are shown in Table 1 together with the results of Example 1.

TABLE 1

| | In formula (I) | | | | Phase transition point (°C.) | | | |
|---|---|---|---|---|---|---|---|---|
| Example | $R^1$ | A | B | $R^2$ | C | S | N | I |
| 1 | $C_3H_7$ | cyclohexyl | biphenyl | CN | . 84.8~85.2 | — | . 85.9 | . |
| 2 | $C_5H_{11}$ | cyclohexyl-phenyl | phenyl | CN | . 114.1~116.4 | — | (. 62.7) | . |
| 3 | $C_5H_{11}$ | bicyclohexyl | phenyl | CN | . 86.4~89.8 | — | (. 80.2) | . |
| 4 | $C_7H_{15}O$ | phenyl | phenyl | CN | . 57.5~61.0 | — | (. −25.9)* | . |
| 5 | $C_7H_{15}$ | cyclohexyl | phenyl | CN | . 65.0~65.7 | — | (. −34.9)* | . |
| 6 | F | phenyl | phenyl-cyclohexyl | $C_3H_7$ | . 97.5~98.6 | — | (. 57.8) | . |
| 7 | F | phenyl | biphenyl | $C_5H_{11}$ | . 90.8~91.8 | (. 82.4) | — | . |

TABLE 1-continued

| Example | In formula (I) R¹ | A | B | R² | Phase transition point (°C.) C | S | N | I |
|---|---|---|---|---|---|---|---|---|
| 8 | $C_5H_{11}$ | 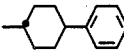 |  | F | . 66.4~67.0 | — | (. 30.3) | . |
| 9 | $C_5H_{11}$ | 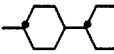 |  | F | . 82.6~84.7 | — | (. 35.8)* | . |
| 10 | $C_7H_{15}$ | 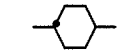 |  | F | . 45.9~46.7 | — | (. −87.9)* | . |
| 11 | $C_7H_{15}O$ | 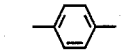 |  | F | . 42.2~43.0 | — | (. −57.9)* | . |
| 12 | $C_8H_{17}$ | 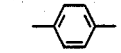 |  | F | . 34.5~35.1 | — | (. −117.9)* | . |
| 13 | Cl | 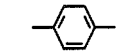 |  | $C_3H_7$ | . 113.0~113.9 | — | (. 109.6) | . |
| 14 | $C_3H_7$ | 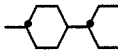 |  | $-OC_5H_{11}$ | . 77.3~78.1 | — | (. 75.5) | . |
| 15 | $C_3H_7$ | 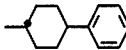 |  | $-OC_5H_{11}$ | . 80.0~80.8 | — | (. 63.6) | . |
| 16 | $C_3H_7$ | 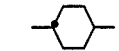 |  | $C_5H_{11}$ | . 76.4 | . 86.3 | — | . |
| 17 | $C_5H_{11}$ | 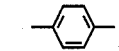 |  | $C_3H_7$ | . 83.0~83.4 | — | (. 60.4)* | . |
| 18 | $C_3H_7$ | 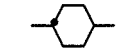 |  | $C_3H_7$ | . 71.7~72.7 | — | (. 49.1)* | . |
| 19 | $C_7H_{15}$ | 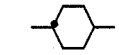 |  | $C_3H_7$ | . 73.8~74.3 | — | (. 57.2)* | . |
| 20 | $C_3H_7O$ | 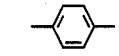 |  | $C_3H_7$ | . 104.4~105.3 | — | (. 66.3) | . |
| 21 | $C_3H_7$ | 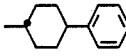 |  | $C_3H_7$ | . 129.7 | — | . 140.9 | . |
| 22 | $C_3H_7$ | 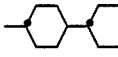 |  | $C_3H_7$ | . 108.2 | . 120.5 | . 154.0 | . |
| 23 | $C_5H_{11}O$ | 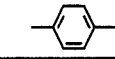 |  | $-OC_5H_{11}$ | . 76.8~78.1 | — | (. −5.6)* | . |

Phase symbols C, S, N and I in the Table show crystalline, smectic, nematic and isotropic liquid phases, respectively, and the numeral figures on the right side of dot symbols · below each of C, S, N and I exhibit the transition points (°C.) from one of the phases to the adjacent phase on the right side thereof. Further, the parenthesis symbol ( ) means that the phase above the symbol ( ) appears at the time of cooling. Further, symbol * represents a value obtained according to extrapolation method from a value obtained from the respective mixtures of the listed compounds with other liquid crystal compounds.

EXAMPLE 24 (COMPOSITION EXAMPLE)

A liquid crystal composition (A) consisting of trans-4-propyl-(4'-cyanophenyl)cyclohexane, 27.5% by weight, trans-4-pentyl-(4'-cyanophenyl)cyclohexane, 42.5% by weight, and trans-4-heptyl-(4'-cyanophenyl)cyclohexane, 30.0% by weight, has a N-I point of 52.1° C. and a viscosity at 20° C. of 23.4 cp. When the liquid crystal composition is sealed in a TN cell (twisted nematic cell) having a cell thickness of 10 μm, the operating threshold voltage is 1.54 V and the saturation voltage is 2.13 V. A liquid crystal composition having 13% by weight of the compound of Example 22 of the present invention dissolved in 87% by weight of the liquid crystal composition (A) had a N-I point raised up to 64° C. and a viscosity at 20° C. of 27.0 cp, that is, its rise being slight. When the composition was sealed in the above TN cell to measure its specific properties for display, the operating threshold voltage was 1.79 V and the saturation voltage was 2.42 V.

EXAMPLE 25 (COMPOSITION EXAMPLE)

A liquid crystal composition consisting of trans-4-propyl-(4'-cyanophenyl)cyclohexane, 24% by weight,
trans-4-pentyl-(4'-cyanophenyl)cyclohexane, 37% by weight,
trans-4-heptyl-(4'-cyanophenyl)cyclohexane, 26% by weight, and

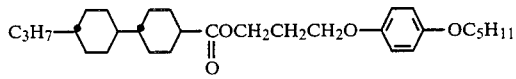

(compound of Example 14) 13% by weight, had a N-I point of 52° C., and when this liquid crystal composition was sealed in the same TN cell as the above, the operating threshold voltage was 1.61 V and the saturation voltage was 2.17 V. The viscosity at 20° C. was 28 cp.

EXAMPLE 26 (COMPOSITION EXAMPLE)

A liquid crystal composition consisting of trans-4-propyl-(4'-cyanophenyl)cyclohexane, 27% by weight,
trans-4-pentyl-(4'-cyanophenyl)cyclohexane, 39% by weight,
trans-4-heptyl-(4'-cyanophenyl)cyclohexane, 29% by weight, and

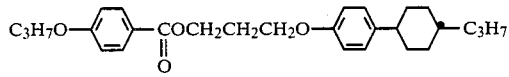

(compound of Example 20) 5% by weight, had a N-I point of 51° C., and when the composition was sealed in the same TN cell as the above, the threshold voltage was 1.52 V and the saturation voltage was 2.05 V. The viscosity at 20° C. was 25 cp.

EXAMPLE 27 (COMPOSITION EXAMPLE)

A liquid crystal composition consisting of 4-phenyl-4'-cyanobiphenyl, 41% by weight,
4-heptyl-4'-cyanobiphenyl, 26% by weight,
4-octyloxy-4'-cyanobiphenyl, 13% by weight,
4-pentyl-4'-cyanoterphenyl, 10% by weight, and

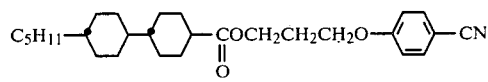

(compound of Example 3) 10% by weight, had a nematic temperature range of 0°~64° C.

EXAMPLE 28 (COMPOSITION EXAMPLE)

A liquid crystal composition consisting of 4-pentyl-4'-cyanobiphenyl, 41% by weight,
4-heptyl-4'-cyanobiphenyl, 26% by weight,
4-octyloxy-4'-cyanobiphenyl, 13% by weight,
4-pentyl-4'-cyanoterphenyl, 10% by weight, and

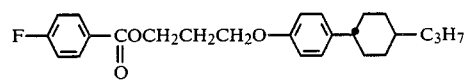

(compound of Example 6) 10% by weight, had a nematic temperature range of 5°~61° C.

EXAMPLE 29 (COMPOSITION EXAMPLE)

A liquid crystal composition consisting of 4-pentyl-4'-cyanobiphenyl, 43% by weight,
4-heptyl-4'-cyanobiphenyl, 27% by weight,
4-octyloxy-4'-cyanobiphenyl, 14% by weight,
4-pentyl-4'-cyanoterphenyl, 11% by weight, and

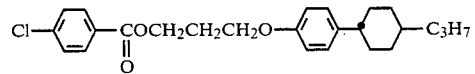

(compound of Example 13) 5% by weight,
had a nematic temperature range of 5°~64° C.

What we claim is:

1. A phenoxypropanol ester derivative expressed by the formula

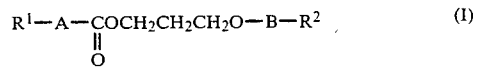

wherein $R^1$ and $R^2$ each represent an alkyl group or an alkoxy group each of 1 to 15 carbon atoms, F atom, Cl atom or CN group, but either one of $R^1$ and $R^2$ is necessarily said alkyl group or alkoxy group; A represents

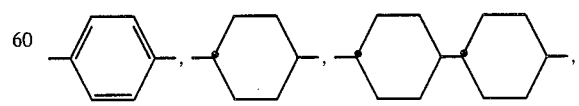

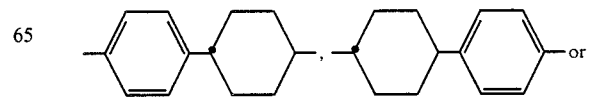

-continued

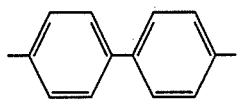

and B represents

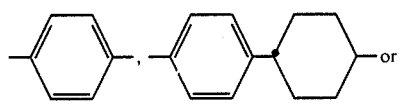

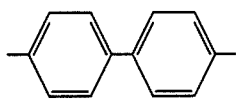

2. A phenoxypropanol ester derivative according to claim 1 wherein $R^1$ and $R^2$ in said formula (I) both represent an alkyl group or an alkoxy group each of 3 to 7 carbon atoms.

3. A phenoxypropanol ester derivative according to claim 1 wherein $R^1$ in said formula (I) represents an alkyl group or an alkoxy group each of 3 to 7 carbon atoms and $R^2$ therein represents CN group.

4. A phenoxypropanol ester derivative according to claim 1 wherein $R^1$ in said formula (I) represents an alkyl group or an alkoxy group each of 5 to 8 carbon atoms and $R^2$ therein represents F atom.

5. A phenoxypropanol ester derivative according to claim 1 wherein $R^1$ in said formula (I) represents F atom and $R^2$ represents an alkyl group of 3 to 5 carbon atoms.

6. A liquid crystal composition having at least two components at least one of which is a compound set forth in claim 1.

* * * * *